June 30, 1970  G. DUBS  3,517,704
WEFT INSERTING DEVICE
Filed Oct. 21, 1966  6 Sheets-Sheet 3
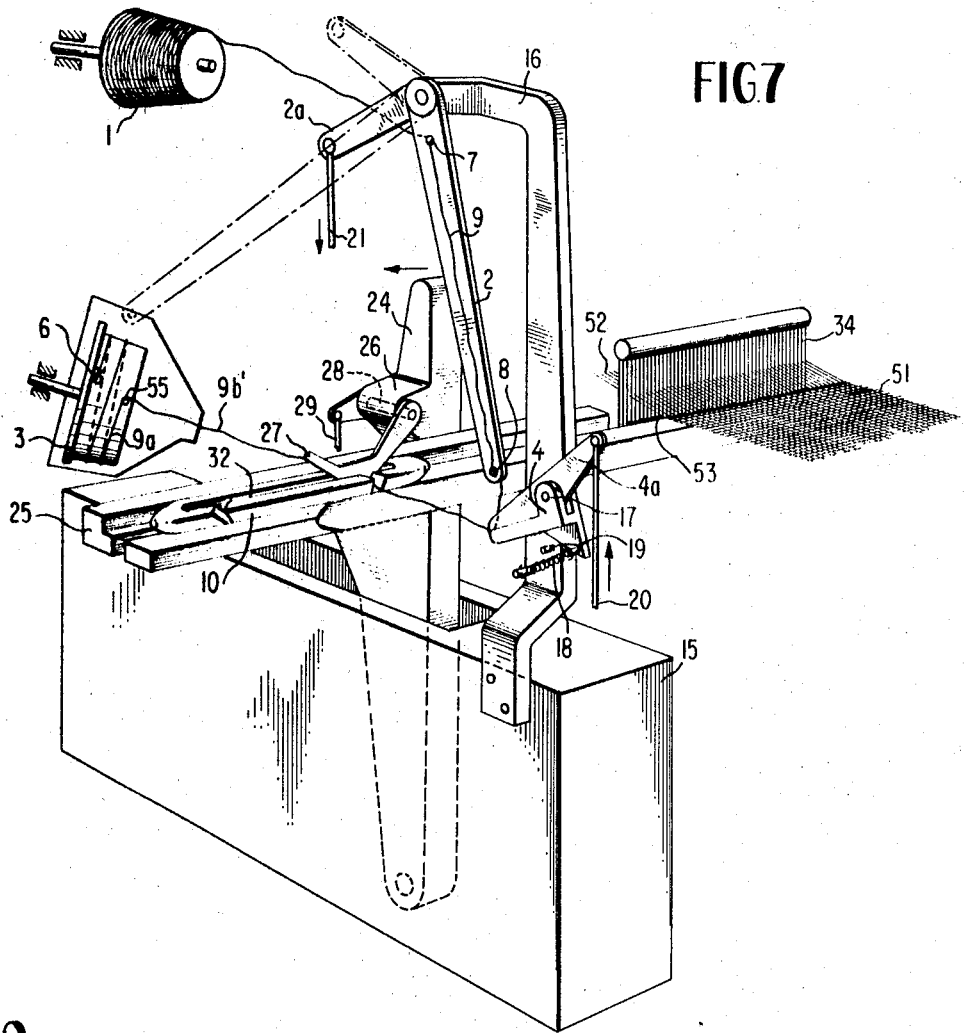
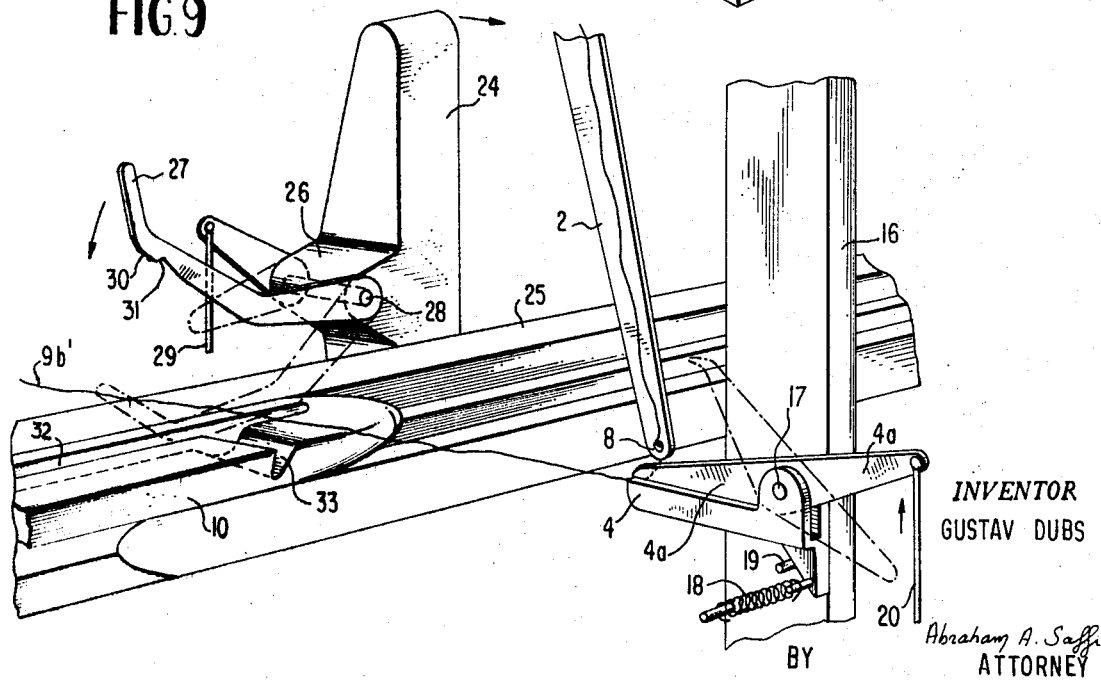
INVENTOR
GUSTAV DUBS
BY Abraham A. Saffitz
ATTORNEY June 30, 1970  G. DUBS  3,517,704
WEFT INSERTING DEVICE
Filed Oct. 21, 1966 6 Sheets-Sheet 4

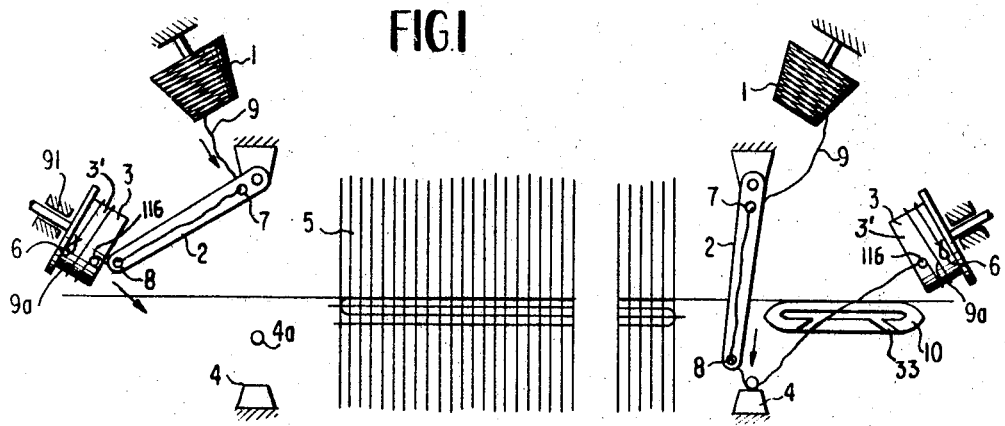
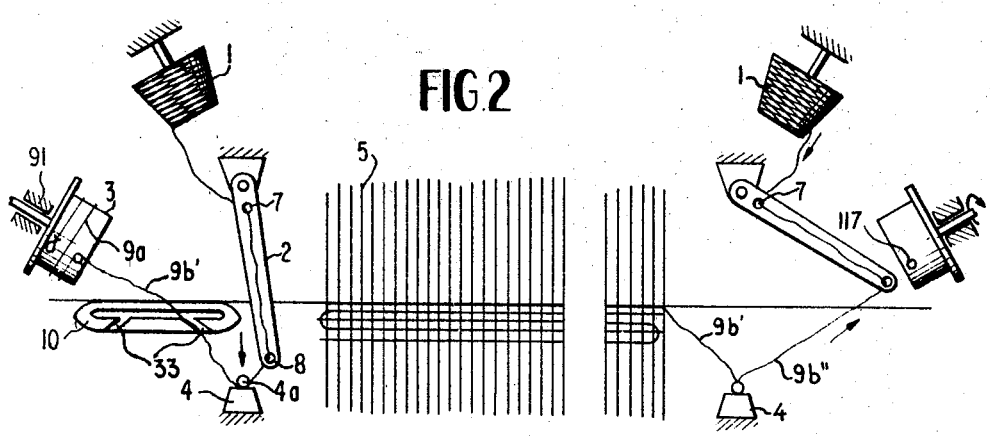
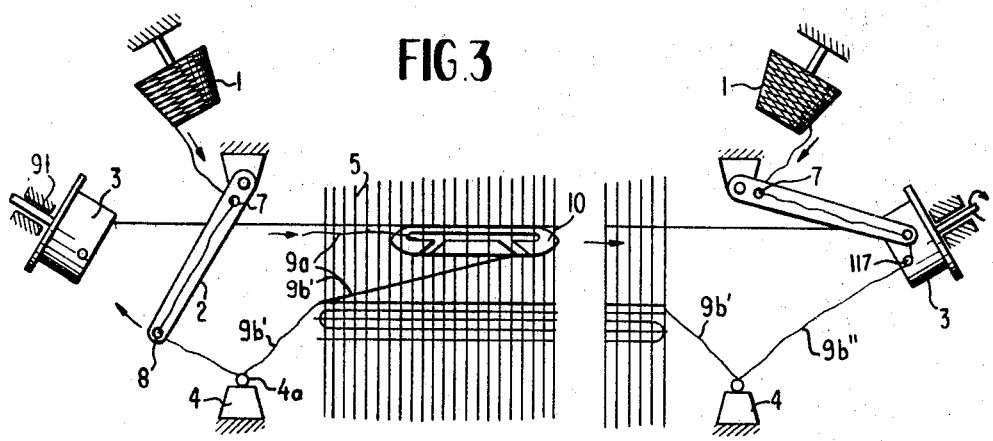
INVENTOR
GUSTAV DUBS

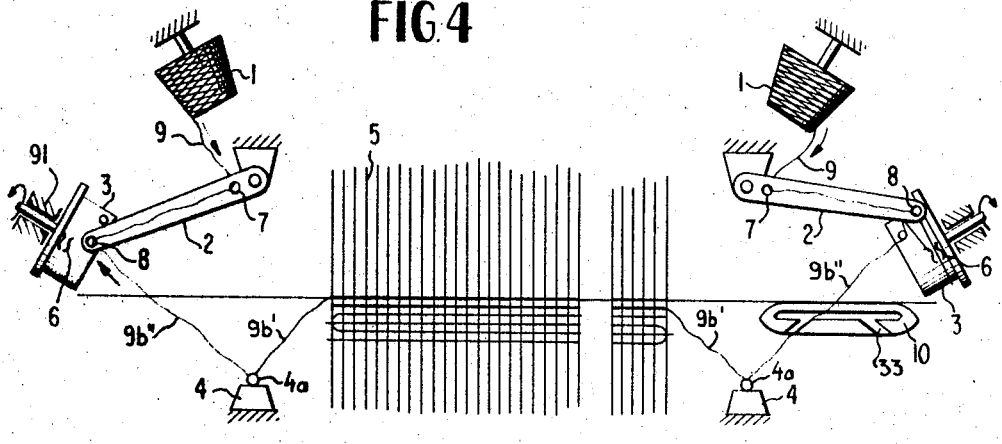
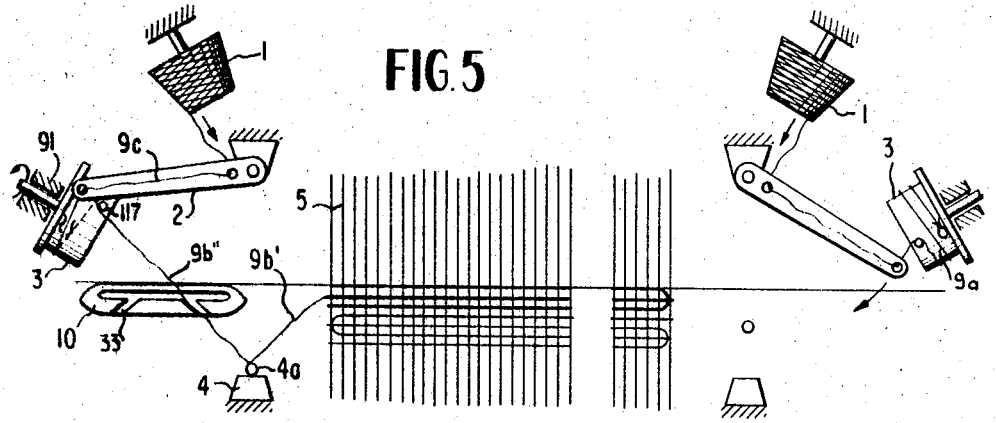
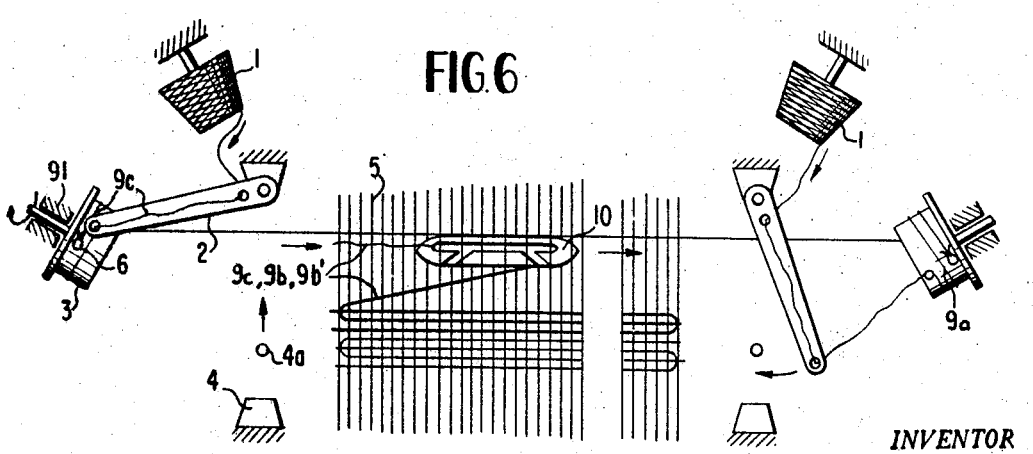

INVENTOR
GUSTAV DUBS

BY Abraham A. Saffitz
ATTORNEY

*INVENTOR*
GUSTAV DUBS

BY

*Abraham A. Saffitz*
ATTORNEY

INVENTOR
GUSTAV DUBS

BY

Abraham A. Saffitz
ATTORNEY

United States Patent Office 3,517,704
Patented June 30, 1970

3,517,704
WEFT INSERTING DEVICE
Gustav Dubs, Arbon, Switzerland, assignor to Adolph Saurer Ltd., Arbon, Switzerland, a corporation of Switzerland
Continuation-in-part of application Ser. No. 395,701, Sept. 11, 1964. This application Oct. 21, 1966, Ser. No. 588,545
Claims priority, application Switzerland, Sept. 12, 1963, 11,321/63, 11,323/63, 11,327/63
Int. Cl. D03d 47/00
U.S. Cl. 139—122      11 Claims

ABSTRACT OF THE DISCLOSURE

A loom is provided with a measuring device having a rotatable drum on which lengths of weft are wound and a weft holder which releasably grips the weft at a point spaced from the drum so that a weft between the drum and holder can be picked up by a picking member. In addition, a rocking lever is mounted to supply the weft in alternating fashion to the drum and holder. Also, a combination clamp and cutter is mounted on the drum to clamp the weft feed to the drum from the lever so that the weft can be cut thereat.

---

The present invention is a continuation-in-part of our applications Ser. No. 395,701, filed Sept. 11, 1964, entitled "Weft Inserting Device"; Ser. No. 395,702, filed Sept. 11, 1964, entitled "Dosing Device for Looms"; and Ser. No. 395,704, filed Sept. 11, 1964, entitled "Weft Feed System," all now abandoned.

The invention set forth in the present continuation-in-part application relates to weaving looms, and more particularly to looms of the kind wherein the weft is drawn from a stationary storage spool and inserted in the shed by picking members or shuttles that do not include any bobbins. For example, the invention relates to looms of known types such as that referred to in U.S. Pat. Nos. 3,050,088, 2,662,556 and 2,005,390. Still more particularly, this invention relates to measuring devices for measuring parts of a weft introduced in hairpin fashion into a shed.

Heretofore, looms have been known wherein weft hairpins are introduced into a shed in hairpin fashion, for example, as described in U.S. Pat. 2,604,123. Also, measuring devices for introducing a weft into a shed have been known, for example, as in U.S. Pats. 3,050,088, 2,662,556 and 2,005,390. However, the speed of such looms has been limited to a degree by the mechanisms used to insert the weft thread. Also, the measuring devices have been known to be disadvantageous.

The loom of the present invention is distinguished by its simplicity of construction, excellence of performance and its substantial freedom from operational difficulties of present day looms.

The present invention contemplates a loom of the type, for example, as in U.S. Pat. 2,604,123 with a picking mechanism including a stationary storage spool, a measuring device, a weft holder disposed in proximity to the shed, and a movable guide member designed to alternately convey the weft from the measuring device, across the path of the picking member, to the weft holder, and to convey the weft from the weft holder, across the path of the picking member, to the measuring device, the weft held by the weft holder being caught by the gripper in the picking member and then fed into the shed.

In one embodiment of the invention, the weft guide member is provided in the form of a rocking lever; the weft coming from the storage spool is delivered to the rocking lever in proximity to its pivotal axis, and leaves the rocking lever in proximity to the free end thereof.

In another embodiment of the invention, the measuring device includes a drum, peripherally projectable thread entrainment pins on the drum, and a combination gripper and cutter. The distance along the circumference of the drum between the entrainment pins and the combination gripper and cutter is variable. The measuring drums are provided with bores distributed over the periphery of the drum to afford passage for the entrainment pins. The invention also embraces means for selectively projecting the entrainment pins, and for operating the gripper and cutter; a variety of means including mechanical, electrical or pneumatic, being contemplated for this purpose.

The picking mechanisms each function to introduce the weft supplied from the storage spool in two parts, in hairpin fashion, into the shed. Picking takes place alternately from one picking mechanism to the other with a complete cycle involving four shots effected by four revolutions of the shaft of the loom drive so that two shots from each picking mechanism forms a U- or hairpin shaped loop. Since the loops are formed alternately on opposite sides of the weave, a firm selvedge is produced.

Preferably, picking mechanisms including a storage spool, a measuring device, a weft holder and a pivotally displaceable weft guide lever are provided on both sides of the weave, and the shoot may comprise two continuous lengths of weft for disposition either in adjacent or in non-adjacent sheds; viz in adjacent sheds if the weft is taken from one spool (either left or right) and in non-adjacent sheds if the weft is taken from both spools.

The invention contemplates a loom having devices facilitating the introduction of the weft into the picking member and securing such weft in the picking member in a positive and, therefore, reliable manner.

Another feature of the present invention is to provide the loom with specially designed measuring devices wherein the desired length of the weft is measured off and cut off, and is then introduced into the shed in two continuous parts. A particularly important object of this phase of the invention is that the measuring device is adapted to measure off unequal parts of a continuous length of weft and to cut said length of weft subsequent to such differential measurement or dosing operation.

In the drawings of which FIGS. 1 to 6 are schematically drawn:

FIG. 1 shows the components of the picking system of the invention in the initial position at the start of the first stroke, with the picking member in its extreme position on the right;

FIG. 2 shows positions of the several components at the start of the second stroke, with the picking member in its extreme position on the left;

Figure 8:
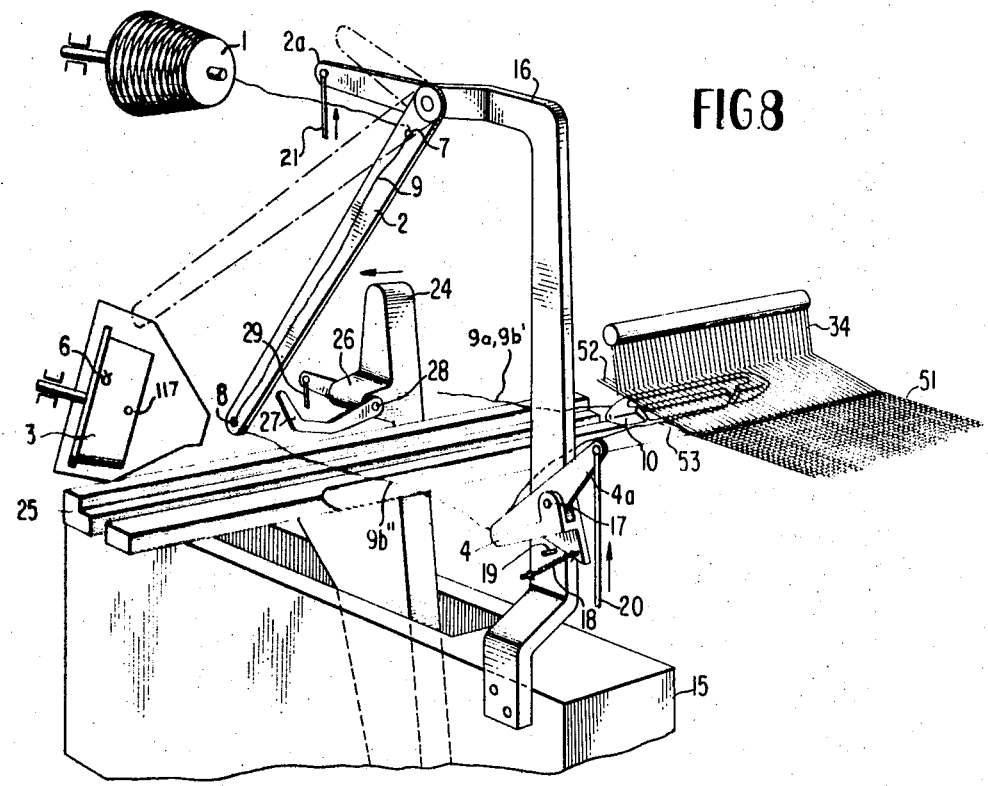
Figure 16:
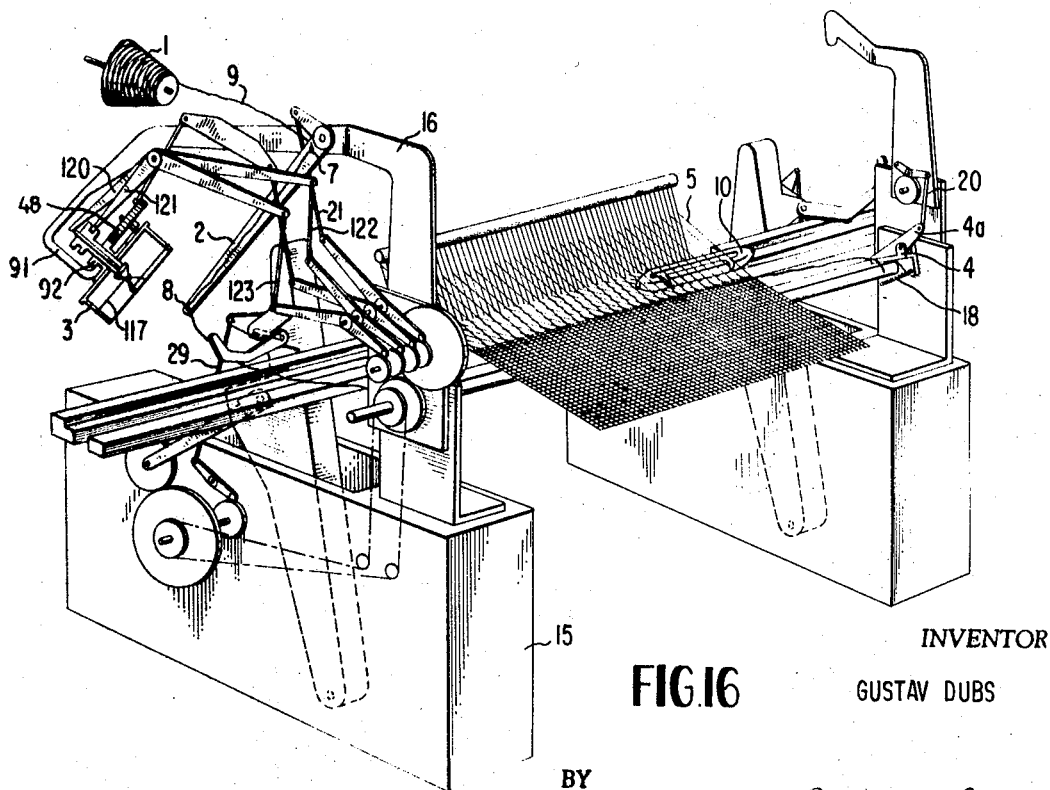
Figure 11:
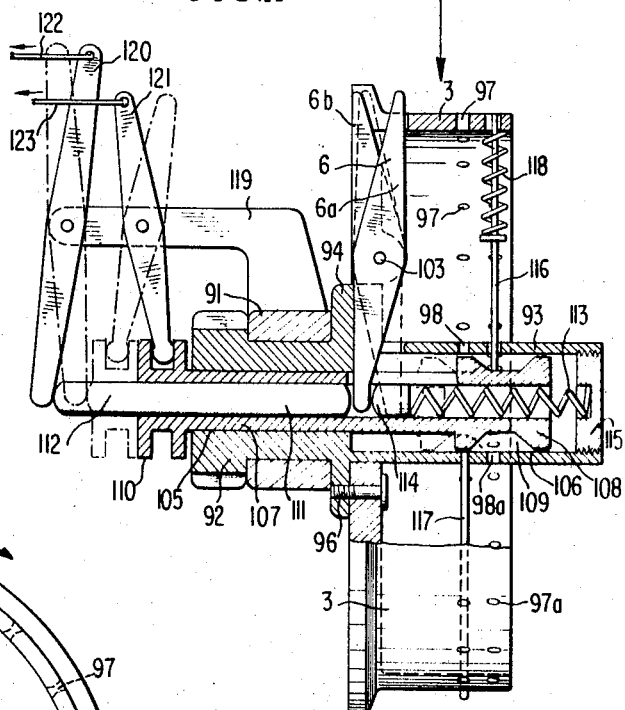
Figure 10:
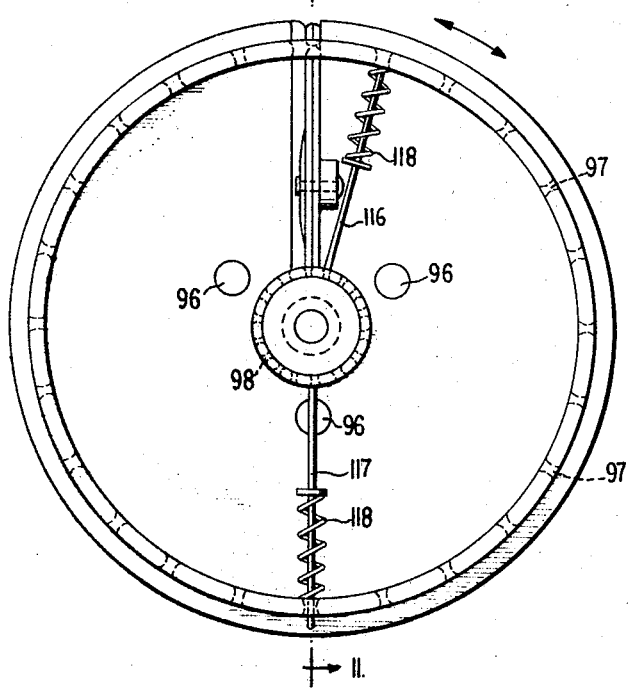
Figure 12:
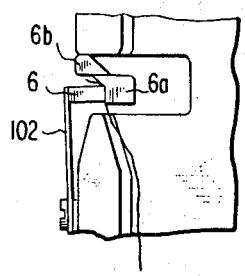
Figure 13:
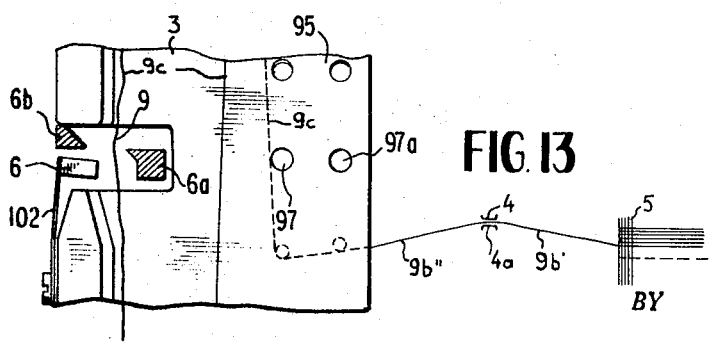
Figure 14:
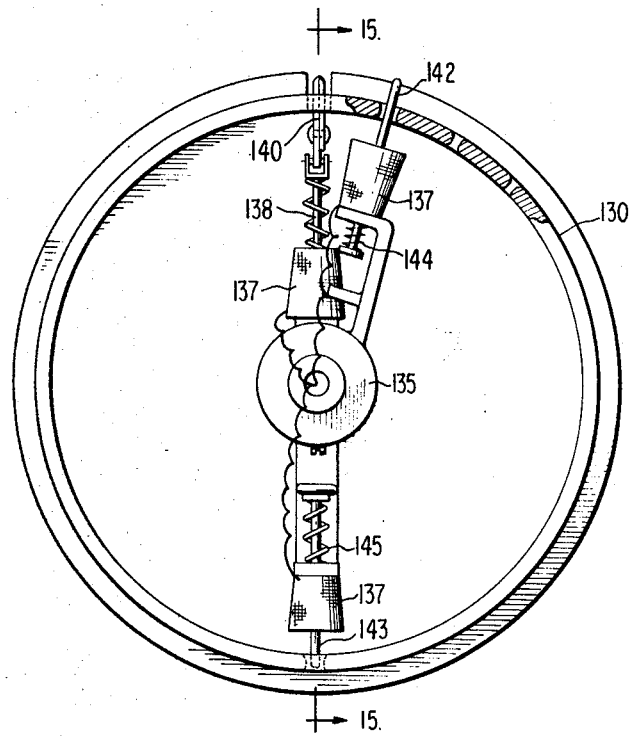
Figure 15:
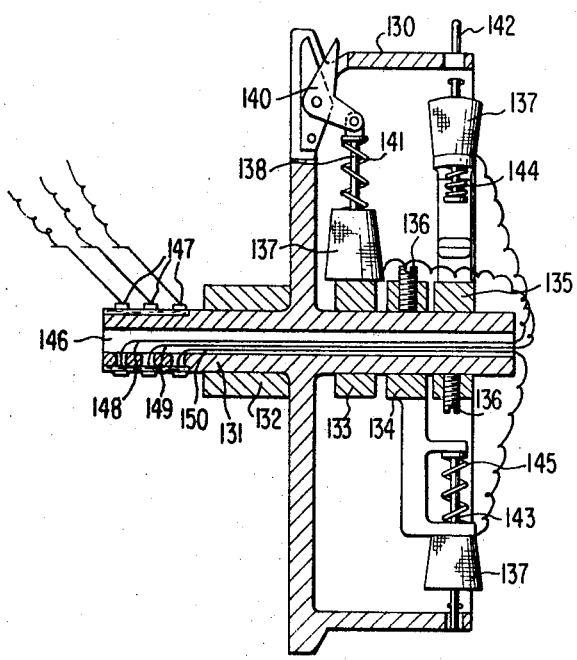

FIG. 3 shown an intermediate position on the course of the second stroke, with the picking member in an intermediate position within the shed;

FIG. 4 shows positions of the various components at the start of the third stroke, with the picking member again on the extreme right;

FIG. 5 shows positions of the components at the start of the fourth stroke with the picking member again on the far left;

FIG. 6 illustrates positions of the several components in the course of the fourth stroke, with the picking member in an intermediate position within the shed;

FIG. 7 is a showing in perspective of the device for introducing the weft into the picking member or shuttle, on the left side of a loom;

FIG. 8 is a view similar to that in FIG. 7 showing a phase of introducing the weft into the shed;

FIG. 9 is a perspective view similar to that of FIGS. 7 and 8 showing a detail in a larger scale and illustrating parts in positions before introducing the weft into the picking member;

FIG. 10 is an end view of a dosing device according to one embodiment of the invention;

FIG. 11 is a section along line 11—11 in FIG. 10;

FIG. 12 is a partial view of a detail of FIG. 11 viewed in the direction of the arrow shown in FIG. 11, and drawn to a larger scale;

FIG. 13 is a view similar to that of FIG. 12, but amplified relative thereto and with the parts shown in a different position;

FIG. 14 is an end view of a dosing device of a second embodiment of the invention;

FIG. 15 is a section along line 15—15 in FIG. 14; and,

FIG. 16 is a partial perspective view of the cam mechanism driven in synchronization with the drive of the loom.

Referring to the drawings wherein like elements are denoted by identical reference numerals and referring particularly to FIGS. 1–6, a loom L which is adapted to form a shed 5 and which is similar to that described in U.S. Pat. 2,604,123 mounts a picking system according to the invention on opposite sides of the shed 5. The picking system according to the invention is seen to comprise, disposed on both sides of the weave, a stationary storage spool 1, a rocking lever 2, a measuring drum 3, and a weft holder 4, 4a, this holder being located in proximity to the shed 5. The measuring drum 3 is provided with a clamp and cutter member 6, 6a, 6b. Rocking lever 2, dosing drum 3 and weft holder, 4, 4a, are mounted in bearings which are fixed on the frame of the loom. As shown by arrows in FIGS. 1 and 3, the rocking lever 2 swings back and forth in pendulum fashion between the measuring drum 3 and the weft holder 4, 4a, and acts as a guide member for the weft coming from spool 1. The picking member 10 is provided with gripping portions 33.

Each storage spool 1 is mounted on the loom L to supply weft for the picking system to introduce into the shed 5.

Each rocking lever 2 is mounted adjacent a storage spool 1 to receive the weft therefrom while maintaining the free end of the received weft at the free lower end of the lever 2. Each rocking lever 2 is also mounted to pivot under the influence of a suitable rocking mechanism (not shown) in synchronism with the operation of the loom L. Preferably, the rocking mechanism is driven directly from the loom drive (not shown). The pivoting of each rocking lever 2 is such as to move the lower end of the lever 2 from a point above the measuring drum 3 to a point adjacent the weft holder 4. The point above the measuring drum 3 is such that the end of the weft on the respective lever 2 is positioned to be gripped by the clamping part of the clamp and cutter member 6. The point above the weft holder is such that the weft extending from the end of the respective lever is positioned to be gripped by the weft holder 4.

Each measuring drum 3 is similar in operation to those measuring devices as described in U.S. Pats. 3,050,088, 2,662,556 and 2,005,390 in the function of measuring out a length of weft to be fed into a shed and includes a rotatable surface 3' on which the weft is wound (as shown in FIG. 1). In addition, each measuring drum 3 positions the clamp and cutter member 6 which rotates with the rotatable surface 3' to the rear of the rotatable surface 3' so that when a free end of weft is positioned in the clamp part of the clamp and cutter member 6 the weft can be wound on the rotatable surface 3'. Also, each measuring drum 3 includes a pin 116 (FIG. 5) on the rotatable surface 3' which serves to maintain the windings of weft on the rotatable surface 3'. The clamp and cutter member 6 which can be formed in a similar manner such as the binder and cutter of U.S. Pat. 2,604,123 and actuated in synchronism with the loom via a suitable transmission (not shown) from the loom drive serves a dual purpose of clamping the respective weft to the measuring drum 3 and of cutting the clamped weft in order to allow the severed piece of weft to be inserted in the shed 5. For the first length of weft for a hairpin, the clamp part of the member 6 serves to hold the end of the weft for winding up on the drum 3. For the second length of weft, the clamp part of the member 6 serves to hold the weft for cutting off of the weft length from the weft supply by the cutter part of the member 6.

Each weft holder 4 is spaced from a respective measuring drum 3 to lie on an opposite side of the path of the picking member 10 so that the weft extending between the drum 3 and weft holder 4 lies across the path of the gripping portions 33 of the picking member 10. Also, each weft holder 4 which can be similar in structure to that gripper described in U.S. Pat. 3,050,088 is actuated in similar fashion to open and close by a suitable transmission (not shown) connected to the loom drive.

The operation of the picking system according to the invention will be described with reference to the components of the system disposed on the left side of the weave; the operation of the components located on the right side of the weave is similar but is displaced timewise by one stroke.

As shown in FIG. 1, the weft 9 passes from the storage spool 1, through eyes 7 and 8 disposed in rocking lever 2, to the measuring drum 3. The end of weft is clamped by clamp 6 and a piece of weft 9a corresponding to the width of the weave is wound onto the drum and secured.

Next, as shown in FIG. 2, the rocking lever 2 is pivoted towards the weft holder 4 under the influence of the rocking mechanism (not shown) connected therewith. This causes the weft, which is played out during this time, to extend from about the pin 116 on the drum 3 to the opened weft holder 4. Upon passage of the weft through the weft holder 4, the holder 4 is closed under the influence of the transmission (not shown) connected thereto. A length of weft 9a, 9b' is thus held between the member 6 on the drum 3 and weft holder 4. This length of weft corresponds to the width of the weave being formed in the shed 5. At this point, the clamp part of the member 6 is opened via the transmission (not shown) connected thereto. The picking member 10, which in the course of the part of the operation just described has traveled from right to left, engages, by means of gripping portion 33 and the piece of weft 9a inclusive a part of the additional weft 9b', and on its return stroke toward the right, introduces it, as shown in FIG. 3, into the shed 5. During introduction of the weft length, the windings on the drum 3 are slid therefrom about the pin 116 or where desired, the pin can be retracted to allow the windings to fall from the drum 3.

While the length of weft 9a including part of 9b' is thus introduced into the shed 5, the rocking lever 2, as shown in FIGS. 3 and 4, swings back from the weft holder 4, 4a to the drum 3 which now rotates counterclockwise into a position between the member 6 and pin 117. As the rotatable surface is rotated counterclockwise, the pin 117 engages the weft causing the weft emanating from the end of the lever 2 to wind up on the surface 3'. After a predetermined length of weft has been wound on the drum 3, the lever 2 moves the weft into the opened clamp part of the member 6. The clamp part is then closed on the weft so that a fixed length of weft 9c extends between the weft holder 4 and member 6 on the drum 3 across the path of the gripping portion 33 of the picking member 10. The cutter part of the member 6 is then actuated via the transmission (not shown) connected thereto so as to cut the weft within the member 6. The end of the weft length 9c is thus free of the member 6 while the end of the weft still connected to the supply of the storage spool 1 is held within the clamp part of the member 6.

Picking member 10, which meanwhile has returned to the left side of the fabric, grips the severed weft length 9c via the gripping portions 33 and introduces, while the weft holder 4, 4a opens, the properly dosed length of weft 9c inclusive 9b'' and rest of 9b' into the shed 5 in a manner as for the initial weft length 9a whereby the hairpin-shaped loop is completed.

While the length of weft 9c including 9b'' and the rest of 9b' is thus introduced into the shed 5 the drum 3, after being stopped, rotates clockwise and proceeds to measure off a new length of weft 9a, as shown in FIG. 6, whereby all components of the system are returning to the positions shown in FIG. 1.

As shown in FIGS. 1, 2, 4 and 5, viewed from the fabric side which in this case is the operator's position, when the reed strikes, the drum 3 is located to the rear of, and the weft holder 4, 4a in front of the path of the picking member 10, whereby the weft just introduced in the shed 5 is always disposed on the front face of the picking member 10.

Referring now to FIGS. 7, 8, 9 and 16, frame member 15 on the left side of the loom mounts a bracket 16 which, in its lower portion, carries a pin 17 which in turn mounts for pivotal displacement the weft holder comprising jaws 4 and 4a. Spring 18 tends to force the weft holder 4, 4a against the stop 19. Control rod 20 operatively connects the part 4a of the weft holder with a cam, shown in FIG. 16, which is driven in synchronism with the drive of the loom. The top of bracket 16 mounts for rocking displacement the rocking lever 2, 2a. By means of rod 21, which operatively connects it with the cam driven in synchronism with the drive of the loom, portion 2 of the rocking lever 2, 2a is moved back and forth between the measuring drum 3 and the weft holder 4, 4a. Lever portion 2 is provided with eyes 7 and 8 which are traversed by weft 9 on its passage from the stationary delivery spool 1 to the drum 3, and weft holder 4, 4a, respectively.

Before the loom is placed in operation, the weft 9 follows a path from the delivery spool 1 which passes through the upper eye 7 along the lever 9 and through the lower eye 8 of the lever 9. Initially, at the start of an operation, the lever 9 is in the dotted line position of FIG. 7 such that the free end of the weft 9 is disposed adjacent the drum 3. The free end is then placed on the drum manually or in any other known manner so as to be gripped by a clamp part of the member 6 on the drum surface.

Swords 24 supported for rocking displacement in frame 15 mount the race 25 of the lay. Near its top, sword 24 is provided with an expanded portion 26 which mounts the pressing lever 27 by means of pin 28 which is rigidly connected with lever 27. Rod 29 which leads to the gear driven in synchronism with the drive of the loom is designed to rock pressing lever 27 in the place of the weft. Pressing lever 27 is shaped like a shoe, and includes an oblong straight rail portion 30 provided with a catching notch 37.

The weft picking member 10 is arranged for sliding back and forth displacement on the race 25 in a known manner. Member 10 is provided with a longitudinal groove 32, and a transverse groove 33. Reed 34 is mounted on the lay; the fabric is shown at 51 and the upper and lower warp threads forming the shed are illustrated at 52 and 53 respectively.

The operation of the system according to the invention disclosed in FIGS. 7, 8 and 9 for introducing weft 9 into the weft picking member 10, is as follows:

FIG. 9 shows all parts of the loom participating in the introduction of weft 9 in weft picking member 10 in the positions which they occupy shortly before the reed 34 comes to a stop. Weft rocking lever 2 is in its terminal position on the right, and has just transferred weft 9 from the dosing drum 3 to the weft holder 4, 4a. With the parts of the system in this position, the weft 9 extends parallel to the transverse groove 33 provided in the weft picking member 10. When the reed comes to a stop, rod 20 is moved upwardly so as to pivotally displace the weft holder 4, 4a counterclockwise, about the pin 17 and to conduct weft 9b' into the transverse groove 33 (FIG. 9). At the same time, rod 29 is pulled downwardly, whereby the pressing lever 27 is moved down into the longitudinal groove 32 (FIG. 7) so that the weft is held at the bottom of the longitudinal groove 32. Once the reed has struck, the weft picking member 10 starts its run to shoot through the shed. When the weft picking member 10 starts to move, weft holder 4, 4a returns to the position shown in FIG. 9 in dotted lines, e.g., against the stop 19.

More specifically, as viewed in FIG. 7, when the loom is placed in operation with the free end of the weft 9 gripped in the clamp part of the member 6 and the weft wound on the drum 3, the lever 9 is rocked or pivoted into the solid line position. This causes the weft 9 to be played out from the end of the lever 9 through the lower eye 18 and from a retractable pin 117 on the drum 3 as shown while the free end remains fixed on the drum 3. The section of weft near the lower end of the lever 9 is then brought between the jaws 4, 4a of the weft holder (which jaws 4, 4a are open at this time). Upon positioning of the weft between the jaws 4, 4a, the jaws are closed by pivoting the upper jaw 4a counterclockwise under the influence of rod 20 in order to grip the weft. Thus, a length of weft of predetermined length is held between the drum 3 and weft holder jaws 4, 4a.

Next, as the rod 20 continues to pivot the upper jaw 4a and, now simultaneously the lower jaw 4, the fixed length of weft is inserted into the transverse groove 33 of the weft picking member 10. Also, at the same time, the lever 9 is pivoted back towards the dotted line position.

Thereafter, the free end of the weft 9 is released from the drum 3, the weft picking member 10 is passed into the shed and the weft holder is pivoted clockwise into the position shown in FIG. 9. This causes a single pick of predetermined length to be inserted free end first into the shed while the weft remains held by the weft holder jaws 4, 4a. During travel of the member 10 through the shed, the lever 9 pivoted into the dotted line position so that the weft 9 is brought adjacent the drum 3 and wound thereon as shown by virtue of the pin 117 engaging the weft during drum rotation. The cutter part of the member 6 on the drum 3 then grasps the weft as viewed so that the weft is now fixed between the jaws 4, 4a of the weft holder and the drum 3.

After the weft picking member 10 has brought the free end of the weft to the far edge of the fabric, the member 10 is returned to the position shown in FIG. 7. Thereafter, the jaws 4, 4a of the weft holder are first pivoted counterclockwise to insert the weft into the member 10 as above and then pivoted clockwise under the influence of the rod 20 and spring 18 to thus open upon abutment of the lower jaw 4 with the stop 19 allowing the weft to be freed. The weft on the drum 3 is then cut by the cutter part of the member 6 to free the trailing end of the weft while holding the forward free end of the next piece of weft. The weft picking member 10 is then moved into the shed. This allows the weft to be inserted into the shed in a hairpin manner.

The operation for inserting subsequent hairpin loops into the fabric is then repeated.

It is noted that the operation of the lever 9, the weft holder 4 and the weft picking member 10 are in synchronism with each other as well as with the weft measuring drum and loom so that the weft is placed in the shed in an orderly manner.

After introducing the second piece of weft 9b'', in the picking member respectively in the weft in a same manner, at a later stroke, the control rod 20 moves downwardly so as to pivotally displace the jaw 4a of the weft holder in the position shown in FIG. 9 in dotted lines so as to be ready to clamp now a new piece of weft conducted in by the rocking lever 2.

Reference is now made to the part of the invention illustrated in FIGS. 10 to 15, inclusive, wherein the device disclosed two parts of a continuous length of weft are introduced from the side of the pick in hairpin fashion.

Referring to the drawing, and particularly FIGS. 1, 10 to 13 inclusive, and 16, a support 91 mounted on the frame of the loom (shown in FIG. 16) supports for rotary displacement, a pinion 92 including a hub 93 and a flange 94. The drum 3 is secured to flange 94 by means of screws 96. Hub 93 and drum 3 are provided along their respective peripheries with radially aligned bores 98 and 97 and 98a and 97a, respectively.

The combined clamp and cutter 6, 6a, 6b is disposed on the left-hand side of drum 3 and includes a stop member 6 mounted on a flat spring 102, secured to drum 3, and movable clamp and cutter part 6a mounted for rocking displacemennt on pin 103, and a stationary cutter part 6b firmly mounted on drum 3.

The longitudinal bores 105 and 106 of pinion 92 and hub 93, respectively, which have different diameters, accommodate for longitudinal displacement, the tubular slide 107 which on its right-hand extremely mounts a double cone 108, while the other end terminates in a shifting sleeve 110. The bore 111 in slide 107 accommodates for longitudinal displacement a bolt 112 and a shorter bolt 114, the latter being acted upon by a spring 113. Spring 113 abuts against the screw-threaded closure 115 mounted in the end of hub 93. Spring 113 forces through bolt 114 the lower end of part 6a of the clamp and cutter toward the left, thus keeping cutter 6a and 6b open. Pins 116 and 117, guided in bores 97 and 98 and 97a and 98a, respectively, are provided with springs 118 (see FIG. 2) tending to force the pins inwardly.

Since the special picking mechanism in cooperation with which the measuring device of the instant disclosure is employed requires the dosing or measuring off of two continuous parts of wefts of different lengths, two pins 116 and 117 are required which are displaced relative to one another in circumferential direction; pin 116 determines the length of the longer part of weft which is measured off first by the device, while pin 117 determines the length of the shorter part of weft which is measured off second and into a succeeding stroke, to complete the hairpin-like insert.

An arm 119 extending from the support 91 mounts levers 120 and 121 for rocking displacement; levers 120 and 121 are engaged by rods 122 and 123, respectively, which are controlled by cam members (in FIG. 16) driven in synchronism with the drive of the loom. As shown in FIG. 11, levers 120 and 121 are designed to actuate the combination clamp and cutters 6, 6a, 6b, 102 and the pins 116 and 117, respectively.

The operation of the device illustrated in FIGS. 10 to 13, inclusive, and in FIG. 16, is as follows:

At the beginning of the cycle, the drum 3 is stationary with the lever 120 and the lever 121 in the position shown in dotted lines in FIG. 11. The weft 9 is led from a stationary storage spool (shown in FIG. 16) to a feeding means, rocking lever 2, and from there to the closed clamp-cutter where the end of the weft is held between member 6 and part 6a (FIG. 12). Initially, the drum 3 is stationary with the clamp parts 6, 6a opened to receive weft. The feeding means positions a free end of the weft supplied from the weft supply (not shown) between the stop member 6 and cutter part 6a and the part 6a is then closed on the stop member 6 to grip the free end. Thereafter, the drum 3 rotates counterclockwise as viewed in FIG. 10 via the pinion 92 and suitable gearing (48, see FIG. 16) which is driven from the loom drive (not shown). The rotation of drum 3 causes the weft to be wound onto the surface of the drum 3. During this time, the pin 116 projects from the surface of the drum 3 to protect against falling of the windings of the weft from the drum.

As will be pointed out in greater detail hereinafter, the length of the first piece of weft 9a, determined by pin 116, is longer than the length of the second piece of weft 9c, determined by pin 117 (see FIG. 3).

In order to measure out the first piece of weft 9a, the drum 3 is rotated in a clockwise direction (with respect to FIG. 10) by a gear wheel 48 shown in FIG. 16 which engages the pinion 92 until enough weft, corresponding to the desired width of the cloth, has been wound onto the drum. At the same time, the lever 121 is moved by the rod 123 from an intermediate position (not shown) between the position shown in dotted lines and the position shown in full lines in FIG. 11 into the position shown in dotted lines displacing to the left the double cone 108 which projects the pin 116 from the surface of the drum 3. The rotation of the drum is then stopped. According to FIG. 1 the rocking lever 2 is moved from its position close to drum 3 to a position near the weft holder 4, 4a and is retained in this position. The rod 20 moves upwards closing weft holder 4, 4a which holds weft. The pin 116 prevents the weft from sliding off the drum. The first piece of weft 9a now lays on the drum (refer also to FIGS. 1, 2 and 9).

The two rods 122 and 123 are now moved, rod 122 to bring the lever 120 into the position shown in full lines in FIG. 11, thereby opening the clamp-cutter assembly 6, 6a, 102, and rod 123 to bring the lever 121 into an intermediate position not shown in FIG. 11, thereby withdrawing the pin 116 from the surface of the drum 3.

The fixed length of weft is then inserted into the weft picking member 10, for example, by means of a depression hook 27 as described in U.S. Pat. 2,604,123, the free end of the weft being released from the clamp-cutter member 6 at this time or shortly before insertion of the weft into the picking member 10.

The weft picking member 10 as shown in FIG. 3, is used to insert the weft 9a, including a part of 9b' into the shed 5 to thereby form the first part of the "hairpin" which is also illustrated in FIGS. 1 to 5, inclusive.

After the insertion of the weft 9a, including a part of 9b', the shed 5 changes and the rocking lever 2 is moved from its position near the weft holder 4, 4a back to its position near the drum in order to measure off the second piece of weft 9c. Because the second part of the "hairpin" to be introduced in the shed by the picking member at a later stroke includes the rest of the additional weft 9b' withdrawn from the spool 1 by the rocking lever at its first travel from the drum 3 to the weft holder 4, 4a, the second piece of weft 9c to be measured off by the dosing device must be shorter than the first piece 9a.

At the same time that the shed 5 changes and the rocking lever 2 is moved back to its position near the drum, the lever 120 moves to the position shown in dotted lines in FIG. 11 to close the clamp-cutter 6, 6a, 6b, 102 and the lever 121 changes from an intermediate position not shown in FIG. 11 to the position shown in full lines in FIG. 11 projecting thereby the pin 117 from the surface of the drum 3. The drum now is rotated in a counterclockwise direction with respect to FIG. 10 (refer also to FIG. 4) and projected pin 117 passing the weft 9b catches and winds it in a helix upon the revolving drum.

After the beginning of the last recessing turn of drum 3 the lever 120 moves from the position shown in dotted lines in FIG. 11 into the position shown in full lines opening the clamp-cutter 6, 6a, 6b. As shown in FIG. 13, the weft is laid therein by the rocking lever 2 which has already been returned to its position near the drum just above and adjacent to the clamp-cutter means, as shown also in FIG. 5. The second piece of weft has now been measured and the rotation of the drum is stopped. Meanwhile the picking member is returned from the right side of the loom to the left side and the operation of introducing weft into the transverse groove 33 as described hereinabove and shown in FIG. 7 with rocking lever in position shown in dotted lines occurs. The lever 121 is now moved to an intermediate position between full and dotted lines, not shown in FIG. 11, to retract the pin 117 and the lever 120 is moved in the position shown in dotted lines in FIG. 11, closing the cutter part 6a to cut off the piece of weft between the blades 6a and 6b and clamping the end of the new piece of weft between and part 6 and the cutter part 6a.

Thereafter, the weft between the clamp-cutter member 6 and weft holding device 4 is inserted into the weft inserting member 38 in a manner as above, the weft holding device 4 is opened and the weft picking member 10 is shot into the shed as above. This positions the second leg of the hairpin in the shed, free end first.

The weft picking member 10, shown in FIGS. 1 to 6, 7 to 9, and 16, then inserts this second piece of weft 9c inclusive 9b″ and the rest of 9b′ into the shed to complete the "hairpin" (see FIG. 6).

The whole cycle is then accomplished and a new one can now begin.

Referring to the embodiment of the invention illustrated in FIGS. 14 and 15, a drum 130 is supported by means of a hub 131 in a support 132 mounted on the frame of the loom (not shown). Shoulders 133, 134, 135 are mounted on hub 131. Shoulders 134 and 135 can be displaced along the circumference of the hub, set screws 136 being provided to fix their position. Each of the shoulders 133, 134, 135 mounts an electromagnet 137. The electromagnet 137 mounted on shoulder 133, when energized, actuates the combination gripper-cutter 140 by means of a pin 138. The spring 141 tends to keep the gripper-cutter 140 closed. The electromagnet 137 mounted on shoulders 134 and 135, when energized, displaces pins 142 and 143, respectively, outwardly. Springs 144 and 145 tend to retain pins 142 and 143, respectively, in the interior of drum 130. The longitudinal bore 146 in hub 131 accommodates wires 148, 149 and 150 which lead from the current collectors 147 to the electromagnets 137. Return of the current may be effected through ground.

The operation of the measuring device according to FIGS. 14 and 15 is the same as that of the device of FIGS. 10 to 13, except that the impulses for actuating the pins 138, 142 and 143 are transmitted from the cam shaft or similar control member revolving in synchronism with the drive of the loom by electrical means including the electromagnets 137, rather than mechanically as in FIGS. 10 to 13.

Manifestly, the mechanical system of FIGS. 10 to 13 and the electrical system of FIGS. 14 and 15 may be replaced by a pneumatic system for operating pins 138, 142 and 143 and thus, the combination gripper-cutter and the weft length measuring steps.

We wish it to be understood that we do not desire to be limited to the precise details of construction, design and operation shown and described, as modifications within the scope of the following claims and involving no departure from the spirit of the invention nor any sacrifice of the advantages thereof may occur to persons skilled in the art.

We claim:

1. In combination with a loom having a weft delivery spool, a weft measuring device for measuring a length of weft to be delivered from said spool into a shed, and a weft picking member for inserting a measuring length of weft from said measuring device into the shed; weft holder means spaced from said measuring device on an opposite side of said weft picking member for receiving a measured end of the weft and a pivotally mounted feed means for pivoting between said measuring device and said weft holder means across the path of said weft picking member in a direction relative to said weft picking member to position the weft located between said measuring means and said weft holder means with said weft picking member.

2. In a combination as set forth in claim 1 said weft holder means including a pair of pivotally mounted jaws for receiving the measured end of the weft therebetween, spring means connected to one of said jaws for pivoting said one jaw in a first direction away from said weft picking member and towards the other of said jaws, stop means for limiting pivoting of said one jaw, and means connected to said other jaw for reciprocally pivoting said other jaw relative to said one jaw whereby said jaws are held in spaced relation in one relative position to receive weft therein and held together in a second relative position to hold the received weft.

3. In a combination as set forth in claim 1 wherein said weft picking member has a transverse groove therein for receiving weft and said weft holder means and measuring device are mounted to position the weft parallel to said transverse groove.

4. A measuring device for measuring successive lengths of weft for delivery to a shed of a loom in hairpin fashion comprising a rotatable drum having a surface thereon for receiving windings of weft thereon, means on said drum for clamping an end of a length of weft to said drum, a retractable pin spaced from said means adjacent said surface for projecting through the plane of said surface and the weft windings thereon to restrain the windings on said surface from falling therefrom, and means for retracting said pin from passing through said plane to permit the windings on said surface to be removed therefrom.

5. A measuring device as set forth in claim 4 further comprising a second retractable pin mounted within said drum for reciprocal movement into and out of said plane, said second retractable pin being spaced from said first retractable pin transversely of the windings on said surface, and means within said drum for reciprocally moving said second pin into and out of said plane in alternating relation with said first pin whereby different lengths of weft can be wound on said surface.

6. A measuring device as set forth in claim 5 wherein said means includes a cutter for cutting the length of weft on said drum at the end thereof from a supply of weft fed to said drum.

7. The combination of a measuring device having a rotatable drum for receiving windings of weft thereon, a weft holder means spaced from said drum for releaseable holding a portion of weft extending from said drum, a feeding means movably mounted between said measuring device and said weft holder means, said feeding means moving the supplied weft through a path between said pin on said drum and said weft holder means, and a weft picking member removably positioned in said path to engage the weft therein for movement therewith.

8. The combination as set forth in claim 7 wherein said feeding means is a pivotally mounted lever, said lever having a free end including an opening therein for guiding weft therethrough for alternate delivery to said measuring device and said weft holder means.

9. The combination as set forth in claim 7 wherein said measuring device further comprises means on said drum for clamping an end of a length of weft to said drum, a retractable pin spaced from said means adjacent said surface for projecting through the plane of said surface and the weft windings thereon to restrain the windings on said surface from falling therefrom, and means for retracting said pin from passing through said plane to permit the windings on said surface to be removed therefrom.

10. The combination as set forth in claim 9 wherein said weft holder means is movable with respect to said weft picking member to move the weft between said drum and weft holder means into said picking member.

11. The combination as set forth in claim 9 wherein said means includes a cutter for cutting the weft on said drum at the end thereof from a supply of weft fed to said drum by said feeding means.

References Cited

UNITED STATES PATENTS

| | | | |
|---|---|---|---|
| 2,005,390 | 6/1935 | Pool | 139—126 |
| 2,027,806 | 1/1936 | Bird | 139—126 |
| 2,519,786 | 8/1950 | Paabo | 139—127 |
| 3,050,088 | 8/1962 | Schaffer | 139—126 |
| 3,229,725 | 1/1966 | Saito | 139—122 |

FOREIGN PATENTS

| | | |
|---|---|---|
| 825,109 | 12/1959 | Great Britain. |
| 1,042,867 | 9/1966 | Great Britain. |
| 1,042,868 | 9/1966 | Great Britain. |
| 1,042,869 | 9/1966 | Great Britain. |

HENRY S. JOUDON, Primary Examiner

U.S. Cl. X.R.

139—125